0
United States Patent Office 3,061,074
Patented Oct. 30, 1962

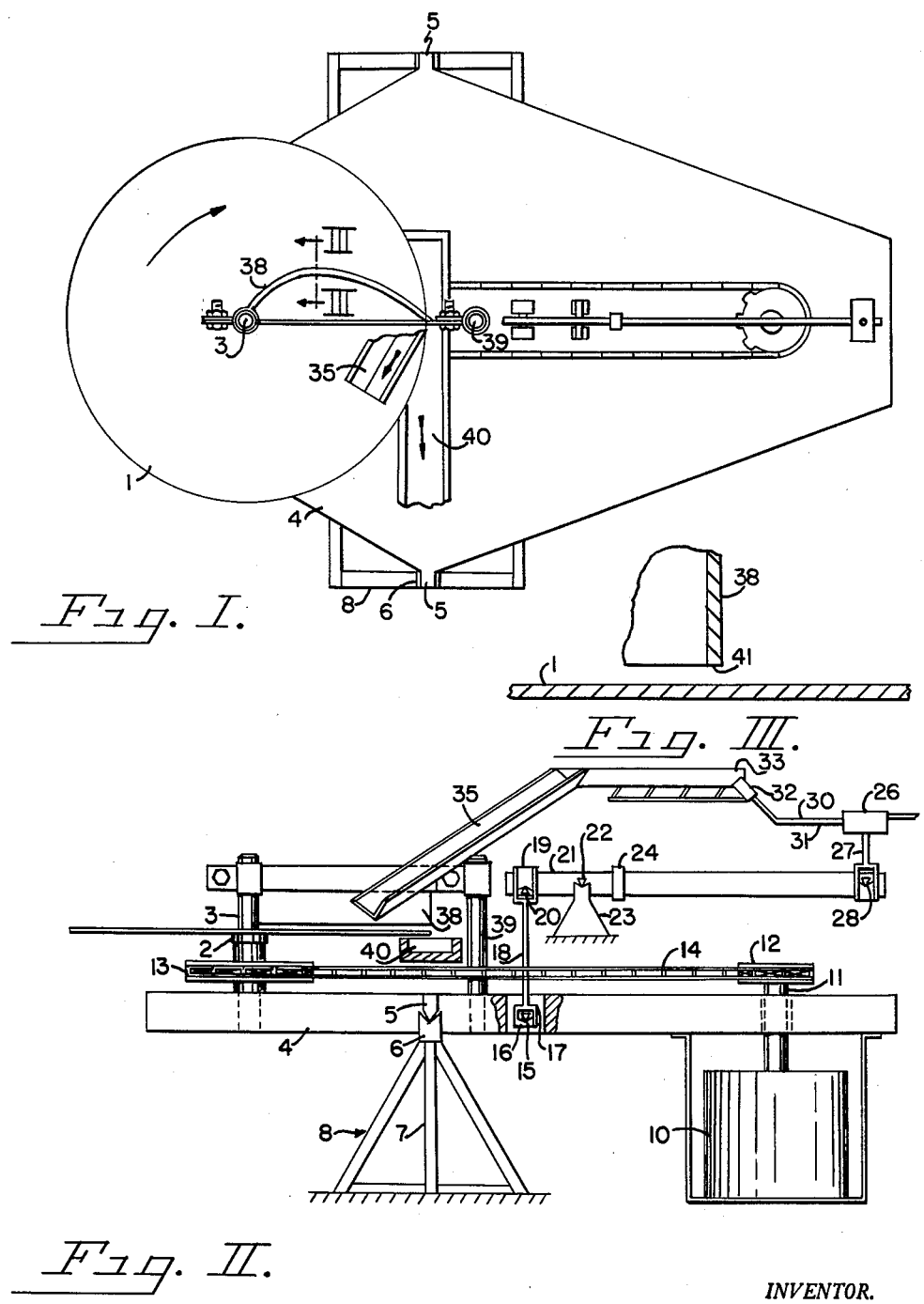

3,061,074
ROTARY CONVEYOR
Albert Musschoot, Barrington, Ill., assignor to Chain Belt Company, Milwaukee, Wis., a corporation of Wisconsin
Filed Jan. 23, 1961, Ser. No. 84,442
10 Claims. (Cl. 198—52)

This invention relates to rotary conveyors and in particular to improved means for discharging material from such a conveyor.

A rotary conveyor, a generally circular table rotated about a vertical axis, may be used as an intermediate conveyor to connect other conveyors, or it may be used as a temporary storage of materials in a processing operation. In the usual rotary conveyor of this type the material is scraped off of the conveyor by a scraper blade that rides the surface of the conveyor and acts as a plow to divert the material to and over the rim of the table or conveyor. Such an arrangement is satisfactory for some materials but is not satisfactory for granular highly abrasive materials at elevated temperatures.

When a scraper blade is used to discharge abrasive material the mating surfaces of the blade and the conveyor table are abraded and rapidly worn away by the material entering the space therebetween.

The principal object of this invention is to provide a rotary conveyor assembly in which the scraper blade is elevated above the surface of the conveyor a distance that is at least equal to the diameter of the average size granule of the material being conveyed.

Another object of the invention is to provide an improved shape of diverter or scraper blade for a rotary conveyor which blade is shaped to provide a substantially uniform depth of material ahead of the blade as the material is diverted to and over the edge of the conveyor.

A further object of the invention is to provide a rotary conveyor table with a material feed system and a diverter or scraper blade arranged so that the material being conveyed is accurately located on the table of the conveyor and is accurately discharged by a scraper blade so to remain on the table for a precisely determined interval of time.

A still further object of the invention is to provide a rotary conveyor in which a thin layer of material is maintained on the conveyor to serve as a cushion for similar material being conveyed on the conveyor.

These and more specific objects and advantages are obtain by a rotary conveyor constructed according to the invention.

According to the invention the improved rotary conveyor comprises a flat rotary table that is rotatable about a vertical axis, a curved diverter blade that is mounted to just clear the table and extend from the center of the table to its margin, means for supporting the diverter blade with its lower edge spaced from the surface of the conveyor table and means for feeding material onto the rotary table symmetrically with respect to a line on the table that is at a fixed distance from the center of rotation of the table.

A preferred embodiment of the invention is illustrated in the accompanying drawings. In the drawings:

FIG. I is a plan view of the improved rotary table as used in a continuous weighing apparatus.

FIG. II is a schematic side elevation of the improved rotary table including portions of a weighing mechanism that supports the table.

FIG. III is a greatly enlarged fragmentary section taken along the line III—III of FIG. I to illustrate the cooperation between the scraper or diverter blade and the surface of the rotary table.

These specific figures and the accompanying description are intended merely to illustrate the invention and not to impose limitations on its scope.

As illustrated in the accompanying drawings and in particular FIGS. I and II the improved rotary conveyor comprises a circular rotary table 1 that is carried on a hub 2 journaled on an upright axle 3 which in turn is mounted in a frame 4. The frame 4, as illustrated, functions as a lever supported on knife edges 5 carried in V-bearings 6 mounted in the upper ends of posts 7 forming part of a base 8.

The weight of the rotary table and a portion of its drive is counterbalanced by the weight of a drive motor 10 which is mounted on the lever-like frame 4 on the opposite side of the knife edges 5 from the rotary table 1 and its immediate support. The motor 10 preferably includes a gear reducer mechanism that drives its output shaft 11 at a slow speed. The output shaft 11 is connected through sprockets 12, 13 and chain 14 to drive the table 1. The rotation is in a clockwise direction as shown in FIG. I. The lever 4 also carries a power pivot 15 that engages a V-bearing 16 in a stirrup 17 connected to the lower end of a steelyard rod 18 the upper end of which is fitted with a similar V-bearing 19 to engage a load pivot 20 of a lever 21. The lever 21 has fulcrum bearings 22 supported on a fulcrum stand 23 and includes a poise 24 that may be positioned along the lever 21 to counterbalance loads applied to the rotary table 1.

Counterbalancing force for the lever 21 is also supplied from a transducer mechanism 26 that is connected through a steelyard rod 27 and knife edge and bearing 28 to the free end of the lever 21. The transducer 26 preferably includes mechanism for varying an electrical current supplied through leads 30 and 31 according to the force applied through the steelyard rod 27. The current flow in the leads 30 and 31 drives a vibratory motor 32 which, in turn, drives a vibratory conveyor 33 that feeds material from a supply, not shown, onto a V-shaped trough 35.

Material sliding down the trough or chute 35 drops onto the upper surface of the rotary table 1 generally symmetrically with respect to a line on the table that is concentric with the axle 3 and that is tangent or generally tangent to the axis of the V-shaped trough 35. The trough is made V-shaped as shown so that, regardless of the quantity or rate of flow, the material will be located symmetrically on the table 1. Thus if a very small quantity is flowing it flows down the bottom of the V and forms a narrow strip centered over the line. As the quantity of flow increases and the trough is filled to a greater extent the material still tends to pile onto the table in an elongated mound that is symmetrical with respect to the troughs and to the line on the table.

As the material is carried around on the table 1 by reason of the rotation it eventually meets a diverter blade 38 which, in plan as seen in FIG. I, curves from a first support at the axle 3 to a second support in the form of a post 39 erected from the lever 4. The blade 38 is convex towards the approaching material on the table 1 and is curved and shaped to direct that material laterally across the table 1 and over its edge and into a trough 40 that may direct the material to a following conveyor or other receptacle. As shown in FIG. III a lower edge 41 of the blade 38 is spaced from the table 1 an appreciable distance which is preferably adjustable so that it may be varied according to the size of the granules of the abrasive material being carried on the table. Preferably the gap between a lower edge 41 of the blade 38 and the table surface should be slightly greater than the dimensions of the average size granule being conveyed. Thus a layer of granules one granule thick is carried on the table 1 and any excess in thickness of the bed beyond the height of the gap is diverted off of the table into the discharge chute 40. This gap between the lower edge of the blade and the table provides an escape for those granules carried next to the surface of the table so that they cannot bind between the edge of the blade and the table and thus wear either of these surfaces. The few granules that are too large to pass through this space intact either are shunted off to the side as they roll on or between the other granules of the layer on the table or if they catch in the space are crushed to dimensions that they may readily pass under the blade. No granules of a size that can embed themselves in either the lower edge of the blade or in the table can be trapped in this space and thus lead to excessive wear of the members.

When the rotary conveyor is employed in a continuous weigher, as illustrated in the drawings, it is also desirable that a uniform pattern of flow along the convex surface of the diverter blade be established so that material remains on the table for an accurately fixed length of time.

In order to secure a reasonably accurate flow along the convex surface of the blade it is shaped so that the angle between the paths of the material approaching the blade and the tangent to the blade at the intersection of the path with the blade is either constant or increases as a function of the radius of the path of the material approaching the blade. If the angle is constant the material tends to accelerate as it approaches the edge of the table because of the increased velocity of the material as it approaches the blade at the greater radius.

Satisfactory results may also be obtained if the obtuse angle, the angle A in FIG. I between the path of the approaching material and the tangent to the blade increases with the radius of the path. In this latter case the material is not accelerated toward the side of the table and the discharge chute 40 quite as rapidly as when the angle remains constant. Therefore, a greater rotary movement of the table is required to discharge a particular increment of material. The increasing angle is of material advantage however when there is substantial friction between the material and the blade which tends to impede the radial component of the motion of the material. An entirely practical shape for the curve of the diverter plate 38 is one that is represented by the polar equation $$R = K\theta^2$$

in which R is the length of the radius vector from the axis of the table to the particular point along the blade and $\theta$ is the angle through which the radius vector is turned from an initial position. The angle $\theta$ reaches a maximum value of approximately two radians when the blade intersects the rim of the table.

Another way of expressing the curve of the blade is to state that the acute angle between the radius vector and the tangent to the blade at the tip of the vector remains constant or increases as a function of the length of the vector. Any of the shapes in which the radial component of the velocity of the material increases as the rim of the table is approached provides a satisfactory discharge of the material without allowing it to accumulate against the face of the diverter blade 38.

The combination of a shaped diverter blade cooperating with a rotating horizontal table the surface of which is spaced from the lower edge of the diverter blade provides a substantially wear free conveyor in which each increment of the conveyed material remains on the table for a precisely determined interval of time that is fixed by the speed of the table and by the position of the point of impact of material feeding down the trough 35 and the position of the blade 38. This makes it possible to accurately convey hot gritty abrasive materials that are too hot for resilient conveying surfaces and that are too abrasive for heat resisting surfaces of metallic or ceramic composition.

Various modifications of the improved conveyor may be made without departing from the spirit and scope of the invention.

Having described the invention, I claim:

1. In an apparatus for conveying granular material, in combination, a rotary horizontal table, means for rotating the table about a generally vertical axis, means for feeding material onto the table, and a diverter blade for shunting material from the table, said diverter blade having its lower edge spaced from the table a generally constant distance that is at least equal to the maximum dimension of an average particle of the granular material being conveyed.

2. In an apparatus for conveying granular material, in combination, a rotary horizontal table, means for rotating the table about a generally vertical axis, means for feeding material onto the table, and means for discharging material from the table, said discharging means comprising a generally vertical surface the lower edge of which is spaced from the table a distance approximately equal to the maximum dimension of average particles of the material and the trace of which is a curve making an angle with the radius vector from the center of the table that increases as the length of the vector increases.

3. In an apparatus for conveying granular material, in combination, a rotary horizontal table, means for rotating the table about a generally vertical axis, means for feeding material onto the table, and means for discharging material from the table, said discharging means comprising a diverter blade having a generally vertical surface opposed to the material on the table, said blade having its lower edge spaced from the table a distance generally equal to the maximum dimension of an average granule of material and having its vertical surface shaped such that the trace of said surface on the table makes an angle with the radius vector intersecting the trace the tangent of which angle varies generally as the square root of the radius.

4. In an apparatus for conveying granular material, in combination, a rotary horizontal table, means for rotating the table about a generally vertical axis, means for feeding material onto the table, and means for discharging material from the table, said discharging means comprising a diverter blade having a generally vertical surface the lower edge of which is spaced above the surface of the table and the trace of which on the table a distance generally equal to the height of a granule of the material being conveyed is a curve the radius of which in polar coordinates increases generally as the square of the polar angle.

5. In an apparatus for conveying granular material, in combination, a rotary horizontal table, means for rotating the table, a diverter blade having an advance and trailing surface for discharging material from the table, means for feeding material onto the table near the trailing surface of the blade, said blade having a lower edge that is parallel to and spaced from the surface of the table a distance generally equal to the height of an average granule of the material being conveyed whereby a thin layer of material is maintained on said table and any excess is discharged by the diverter blade.

6. In an apparatus for conveying granular material, in combination, a rotary horizontal table, means for rotating the table about a generally vertical axis, means for feeding material onto the table intermediate its center and edge, and means for discharging material from the table, said discharge means comprising a diverter blade having a generally vertical surface the lower edge of which is spaced from the table a distance generally equal to the height of a granule of the material being conveyed and the trace of which is convex toward the approaching material and which faces generally away from the center of the table.

7. In an apparatus for conveying granular material, in combination, a rotary horizontal table, means for rotating the table about a generally vertical axis, means for feeding material onto the table along an inclined path the projection of which on the table is generally perpendicular to a radius of the table at the point of impact of the material, and a diverter blade for discharging material from the table, said blade having its lower edge spaced from the table a distance generally equal to the diameters of the granules of material and being oriented to direct the granules toward the rim of the table.

8. In an apparatus for conveying granular material, in combination, a rotary horizontal table, means for rotating the table at constant speed about a generally vertical axis, a diverter blade that extends across a portion of the table and that has its lower edge spaced from the table a distance generally equal to the diameters of the granules of the material being conveyed, said blade being positioned to deflect material toward the rim of the table, and means for feeding material onto a portion of the table moving away from the blade at a point near the blade, whereby the material is carried on the table for at least a half revolution thereof.

9. In an apparatus for conveying granular material, in combination, a rotary horizontal table, means for rotating the table about a generally vertical axis, means for feeding material onto the table in a stream that is generally symmetrical with respect to a stationary point immediately above the table and spaced from its center of rotation, a diverter blade mounted above the table with its lower edge spaced from the table a distance generally equal to the diameters of the granules of the granular material, said blade being oriented to divert material toward the rim of the table, said diverter blade being located between said stationary point and material on said table approaching said point.

10. In an apparatus for conveying granular material, in combination, a rotary horizontal table, means for rotating the table about a generally vertical axis, means for feeding material onto the table symmetrically with respect to a line on the table at a fixed distance from said vertical axis, and a diverter blade extending across at least a portion of the table and spaced from the table a distance at least equal to the diameter of an average granule of material, said diverter blade being adapted to deflect material toward and over the edge of the table.

References Cited in the file of this patent
UNITED STATES PATENTS

| | | |
|---|---|---|
| 2,088,038 | Scott et al. | July 27, 1937 |
| 2,738,886 | Putnam | Mar. 20, 1956 |

UNITED STATES PATENT OFFICE
CERTIFICATE OF CORRECTION

Patent No. 3,061,074                            October 30, 1962

Albert Musschoot

It is hereby certified that error appears in the above numbered patent requiring correction and that the said Letters Patent should read as corrected below.

Column 1, line 49, for "obtain" read -- obtained --; column 4, lines 49 to 51, strike out "a distance generally equal to the height of a granule of the material being conveyed" and insert the same after "table", first occurrence, in line 49, same column 4.

Signed and sealed this 30th day of June 1964.

(SEAL)
Attest:

ERNEST W. SWIDER                            EDWARD J. BRENNER
Attesting Officer                                Commissioner of Patents